(12) United States Patent
Williams et al.

(10) Patent No.: US 9,124,647 B2
(45) Date of Patent: Sep. 1, 2015

(54) COMMUNICATION PROTOCOL ABSTRACTION

(75) Inventors: Harel Williams, Seattle, WA (US); Naizhi Li, Redmond, WA (US); Kunal Nayyar, Bellevue, WA (US); David Steere, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 383 days.

(21) Appl. No.: 13/285,446

(22) Filed: Oct. 31, 2011

(65) Prior Publication Data
US 2013/0110971 A1 May 2, 2013

(51) Int. Cl.
G06F 15/16 (2006.01)
H04L 29/08 (2006.01)

(52) U.S. Cl.
CPC ........ H04L 67/2819 (2013.01); H04L 67/2823 (2013.01); H04L 67/327 (2013.01); *H04L 67/02* (2013.01); *H04L 67/104* (2013.01)

(58) Field of Classification Search
CPC ............. H04L 29/06163; H04L 69/18; H04L 67/2823; H04L 9/08; H04L 65/601
USPC ......................................................... 709/217
See application file for complete search history.

(56) References Cited

U.S. PATENT DOCUMENTS 7,286,841 B2 10/2007 Sun et al.
7,437,440 B2 10/2008 Manion et al.
2004/0181575 A1 9/2004 Mallberg et al.
2008/0049765 A1* 2/2008 Sadler ........................... 370/401
2009/0248693 A1 10/2009 Sagar et al.
2010/0274982 A1 10/2010 Mehr et al.
2010/0318759 A1 12/2010 Hamilton et al.
2011/0016220 A1* 1/2011 Desai et al. .................... 709/230
2011/0038348 A1 2/2011 Borsella et al.
2011/0137436 A1* 6/2011 Chang .............................. 700/90
2012/0011067 A1* 1/2012 Katzin et al. .................... 705/44

OTHER PUBLICATIONS

Stuedi; et al., "The Cloud is the Router: Enabling Bandwidth-Efficient and Privacy-Aware Mobile Applications with Contrail", Published Date: Jun. 2010, http://research.microsoft.com/pubs/132903/contrail_tech_report.pdf.

* cited by examiner

Primary Examiner — Esther B Henderson
(74) Attorney, Agent, or Firm — Aneesh Mehta; Kate Drakos; Micky Minhas (57) ABSTRACT

One or more techniques and/or systems are provided for processing data requests received over various communication protocols. In particular, a data transfer component may be configured to process data requests and/or responses between requesting devices and data handlers utilizing various communication protocols (e.g., peer-to-peer communication protocols, web based communication protocols, etc.). In particular, communication protocol functionality may be abstracted away from the data handlers, and may be handled by the data transfer component. In this way, data handlers may be communication protocol agnostic because the data transfer component may perform the communication protocol functionality on behalf of the data handlers, which may allow the data handlers to be more "lightweight" and focus primarily on fetching and/or formatting requested data.

20 Claims, 7 Drawing Sheets

COMMUNICATION PROTOCOL ABSTRACTION

BACKGROUND

Many users own a variety of computing devices, such as laptops, desktops, smart phones, and/or other devices. It may be desirable to share data between such devices. In one example, a user may utilize a web service through a web browser on a smart phone to access shared photos originating from a home desktop device owned by the user. In another example, the user may utilize a peer-to-peer music sharing application on a laptop to access shared music files originating from the home desktop device. In this way, the user may share data between devices utilizing various communication protocols, such as a peer-to-peer communication protocol and/or a web based communication protocol (e.g., a protocol associated with a web service, a cloud service, a web browser, etc.). In one implementation of data sharing, one or more data handlers may be associated with a provider device. For example, a home desktop device may comprise a photo handler configured to format and/or send photos stored on the home desktop device to requesting devices. Such data handlers individually comprise communication protocol functionality in order to receive and/or send data requests/responses over various communication protocols (e.g., peer-to-peer communication protocol, web based communication protocol, etc.).

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for processing a data request are disclosed herein. In particular, data communication protocol functionality, conventionally comprised within individual data handlers, may be abstracted away from such data handlers, and may be instead provided by a communication protocol abstraction layer and/or a data transfer component. In this way, the data transfer component may provide the data communication protocol functionality on behalf of the data handlers, thus reducing overhead, cost, etc. associated with data handlers.

In one example of processing a data request, a first data request may be received from a first requesting device over a first communication protocol (e.g., a data transfer component on a desktop device may receive a data request for a photo from a requesting laptop device over a peer-to-peer communication protocol). A first data handler associated with the first data request may be determined (e.g., a photo data handler on the desktop device). The first data request may be formatted for the first data handler to create a formatted first data request. For example, first communication protocol data may be extracted (e.g., removed) from the first data request because the first data handler may not comprise communication protocol functionality associated with the first communication protocol. In this way, the formatted first data request may comprise information useful for the first data handler to retrieve the requested data (e.g., a file name of the photo), and may exclude irrelevant information, such as communication protocol data (e.g., information regarding the requesting laptop device, a requesting application, peer-to-peer routing data, etc.). It may be appreciated that in other examples, the information irrelevant to retrieving the request data, such as communication protocol data, may be left within the formatted first data request. The formatted first data request may be provided to the first data handler for processing.

First processed data may be received from the first data handler (e.g., the requested photo may be received from the photo data handler). The first processed data may be packaged into a first packaged response using the first communication protocol data that was extracted from the first data request. For example, the first packaged response may be packaged with peer-to-peer communication protocol data (e.g., information regarding the requesting laptop device, a requesting application, peer-to-peer routing data, etc.). In this way, the first packaged response may be sent over the first communication protocol to the first requesting device.

In another example of processing a data request, a second data request may be received from a second requesting device over a second communication protocol (e.g., the data transfer component on the desktop device may receive a request for a music file from a smart phone over a web based communication protocol). A second data handler associated with the second data request may be determined (e.g., a music data handler on the desktop device). The second data request may be formatted for the second data handler to create a formatted second data request. For example, second communication protocol data may be extracted from the second data request because the second data handler may not comprise communication protocol functionality associated with the second communication protocol (e.g., information regarding the requesting smart phone, a requesting application, web service information, web based routing data, etc.). In this way, the formatted second data request may comprise information useful for the second data handler to retrieve the requested data (e.g., a file name of the music file), and may exclude irrelevant information, such as communication protocol data, for example. It may be appreciated that in other examples, the information irrelevant to retrieving the request data, such as communication protocol data, may be left within the formatted second data request. The formatted second data request may be provided to the second data handler for processing.

Second processed data may be received from the second data handler (e.g., the requested music file may be received). The second processed data may be packaged into a second packaged response using the second communication protocol data that was extracted from the second data request. For example, the second packaged response may be packaged with web based communication protocol data (e.g., information regarding the requesting smart phone, a requesting application, web service information, web based routing data, etc.). In this way, the second packaged response may be sent over the second communication protocol to the second requesting device. Abstracting communication protocol functionality away from data handlers may allow for a data transfer component to route data sharing requests/responses associated with various communication protocols, without the need for data handlers to individually comprise such communication protocol functionality. It will be appreciated that, unless indicated to the contrary, terms such as "first," "second," and/or the like are merely used herein as identifiers, names, designations, etc. (e.g., to be able to distinguish different elements, items, periods, etc. from one another), and are not meant to imply an ordering, sequence, importance, temporal arrangement, etc.

To the accomplishment of the foregoing and related ends, the following description and annexed drawings set forth certain illustrative aspects and implementations. These are indicative of but a few of the various ways in which one or

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Today, data is commonly shared between computing devices. For example, a user may share photos on a desktop device with a smart phone using a peer-to-peer communication protocol. In another example, the user may share text documents on the desktop device with a laptop device through a web browser using a web based communication protocol. Unfortunately, data handlers (e.g., photo sharing data handler and/or a text document data handler on the desktop device) may be individually developed for various communication protocols. That is, a data handler may be developed with peer-to-peer communication protocol functionality, web-based communication protocol functionality, and/or other protocol functionality so that the data handler may process data requests/responses over such communication protocols. For example, a photo sharing data handler may be developed with both peer-to-peer communication protocol functionality and web-based communication protocol functionality so that the photo sharing data handler may receive data requests and/or send requested data using both the peer-to-peer communication protocol and the web-based communication protocol. It may be advantageous to abstract away such communication protocol functionality from data handlers.

Accordingly, one or more systems and/or techniques for processing data requests are provided herein. In particular, a communication protocol abstraction layer and/or a data transfer component may be configured to handle the communication protocol aspect of data sharing, which may allow for data handlers to focus on the data retrieval aspect of data sharing. Abstracting away communication protocol functionality from data handlers may allow for "light weight" data handlers that are communication protocol agnostic.

Figure 1:
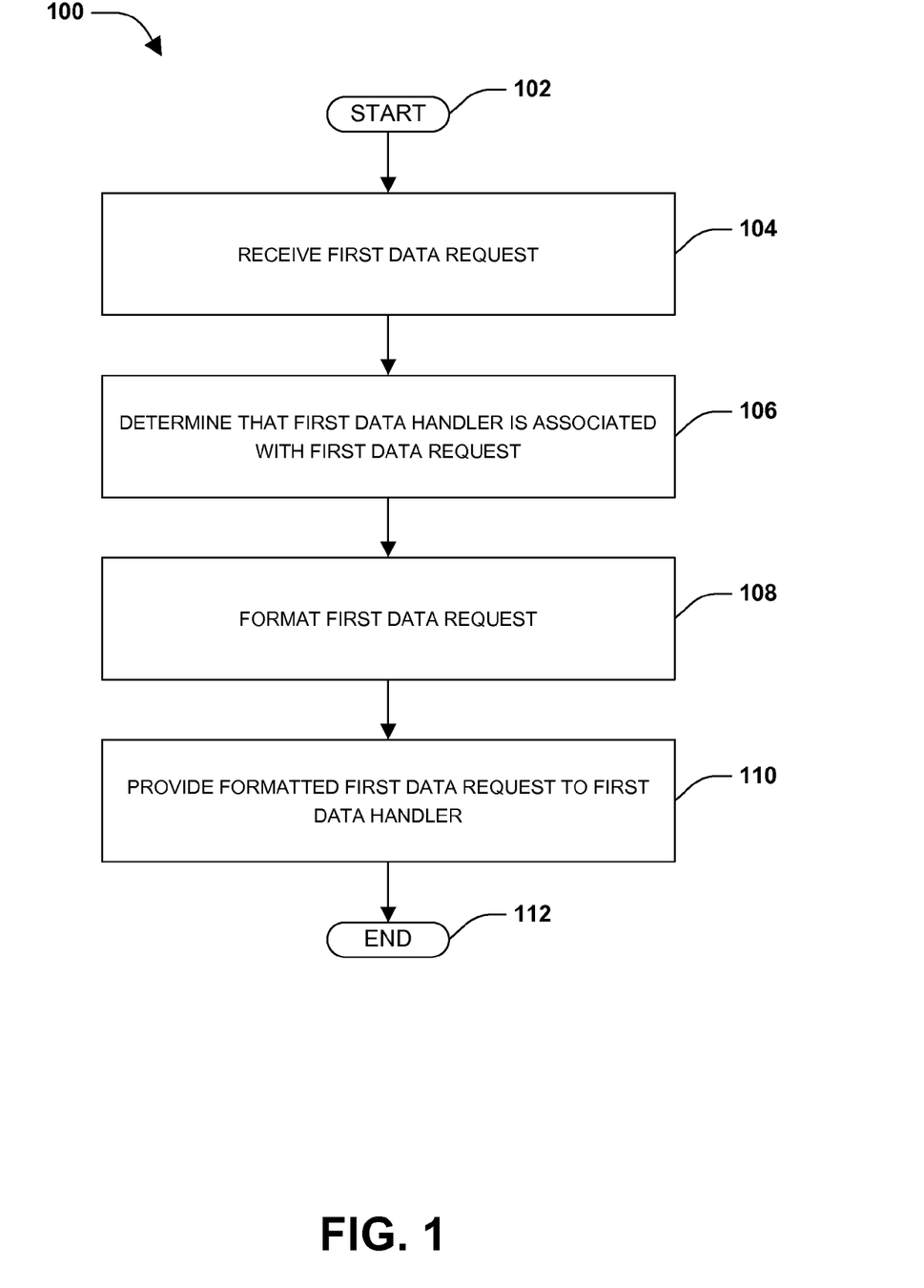
FIG. 1 is a flow chart illustrating an exemplary method of processing one or more data requests.

One embodiment of processing a data request is illustrated by an exemplary method 100 in FIG. 1. At 102, the method starts. At 104, a first data request may be received from a first device over a first communication protocol. The first data request may comprise a variety of information, such as information regarding the requested data (e.g., a file name of the requested data, a data type of the requested data, a directory comprising the requested data, etc.), information regarding data handlers capable of fetching the requested data (e.g., functionality associated with the requested data, such as streaming video, enumerating directories, formatting photos, etc.), communication protocol data (e.g., application information of an application requesting the requested data, a destination location for the requested data, network routing information, etc.), and/or other properties (e.g., properties specific to a particular data handler, non-data handler specific properties, etc.). For example, a first data request for a photo may be received from a photo viewing application on a laptop device over a peer-to-peer connection (e.g., the first data request may be received at a desktop device comprising one or more photos shared by a peer-to-peer photo sharing application). The first data request may comprise an identifier of the photo, a directory location of the photo, an identifier of a photo data handler capable of fetching and/or formatting the photo, peer-to-peer communication/routing information, etc.

At 106, a first data handler associated with the first data request may be determined. In one example, the first data handler may be identifiable based upon information within the first data request. For example, the first data request may comprise an identifier of the photo data handler and/or information regarding the requested data, such as photo resolution, that may be matched with capabilities of a particular photo handler (e.g., a photo handler capable of processing small resolutions may be determined where a thumbnail of a photo is requested). The first data hander may exclude functionality associated with the first communication protocol (e.g., a communication protocol agnostic data handler configured to process data requests without regard to the communication protocol used to receive and/or send data requests/responses).

At 108, the first data request may be formatted for the first data handler. In one example, communication protocol data may be removed from the first data request to create a formatted first data request (e.g., the first data request may merely comprise information relevant to the first data handler for locating and/or formatting requested data). In another example, the communication protocol data may be left within the first data request, and the first data handler may merely ignore such information. It may be appreciated that various other formatting may occur so that the first data handler may efficiently process the formatted first data request.

At 110, the formatted first data request may be provided to the first data handler. It may be appreciated that data requests from one or more requesting devices may be received over various communication protocols, and that such data requests may be associated with various data handlers (e.g., a video stream provider handler, a photo provider handler, a file provider handler, a directory enumeration provider handler, and/or a plethora of other data handlers). As such, one or more queues may be maintained for the various data handlers (e.g., a photo queue may be maintained for data requests directed to a photo handler, a directory enumeration queue may be maintained for data requests directed to a directory enumeration handler, etc.). In one example, the formatted first data request may be placed into a queue associated with the first data handler based upon a priority associated with the formatted first data request. The priority may be determined based upon a number of data requests pending and/or already processed for the first requesting device and/or a requesting application, resources available to the first data handler, priorities assigned to other formatted data requests within the queue, and/or other information, for example. One or more formatted data requests within the queue may be managed based upon computing resources available to the first data handler. For example, if processing resources are unavailable to the first data handler, then one or more formatted data requested may be rearranged and/or suspended within the queue to avoid overloading the first data handler and/or a computing device hosting the first data handler.

First processed data, such as a requested photo formatted to a particular resolution, may be received from the first data handler. The first processed data may be received in various data formats, such as a stream, a file, buffer data, etc. The first processed data may be packaged into a first packaged response using first communication protocol data (e.g., the first data handler may lack communication protocol functionality, such as peer-to-peer communication functionality, and thus the first processed data may lack first communication protocol data used in routing the first processed data back to a requesting application). In this way, the first packaged response may be sent over the first communication protocol to the first requesting device.

It may be appreciated that data requests for various data handlers may be processed. In one example, a second data request may be received from the first requesting device over the first communication protocol. For example, a second data request for a text document may be received from a text editor application on the laptop device over the peer-to-peer connection (e.g., the second data request may be received at the desktop device comprising one or more text documents shared by a peer-to-peer text document sharing application). A second data handler associated with the second data request may be determined (e.g., a text document data handler). The second data request may be formatted for the second data handler. For example, second communication protocol data may be extracted from the second data request to create a formatted second data request (e.g., peer-to-peer communication information, requesting application information, requesting device information, and/or other communication/routing information may be removed from the formatted second data request, such that the formatted second data request may merely comprise information relating to fetching and/or formatting the requested data). The formatted second data request may be provided to the second data handler.

Second processed data may be received from the second data handler (e.g., the text document formatted to a particular file type may be received from the text document data handler). The second processed data may be packaged into a second packaged response using the second communication protocol data associated with the first communication protocol (e.g., peer-to-peer communication protocol data). In this way, the second packaged response may be sent over the first communication protocol to the first requesting device.

It may be appreciated that data requests received over various communication protocols may be processed. In one example, a second data request may be received from a second requesting device over a second communication protocol different from the first communication protocol. For example, a second data request for a photo may be received from a photo viewing website viewed by a web browser on a smart phone over a web based communication protocol, such as through a cloud based web service (e.g., the second data request may be received at the desktop device comprising one or more photos shared by a web based photo sharing application). The first data handler associated with the second data request may be identified (e.g., the photo data handler). The second data request may be formatted for the first data handler. For example, second communication protocol data may be extracted from the second data request to create a formatted second data request (e.g., web based communication information, requesting web service information, requesting device information, and/or other communication/routing information may be removed from the formatted second data request, such that the formatted second data request may merely comprise information relating to fetching and/or formatting the requested data). The formatted second data request may be provided to the first data handler.

Second processed data may be received from the first data handler (e.g., the photo formatted to a particular resolution may be received from the photo data handler). The second processed data may be packaged into a second packaged response using the second communication protocol data associated with the second communication protocol (e.g., web based communication protocol data). In this way, the second packaged response may be sent over the second communication protocol to the second requesting device. At 112, the method ends.

Figure 2:
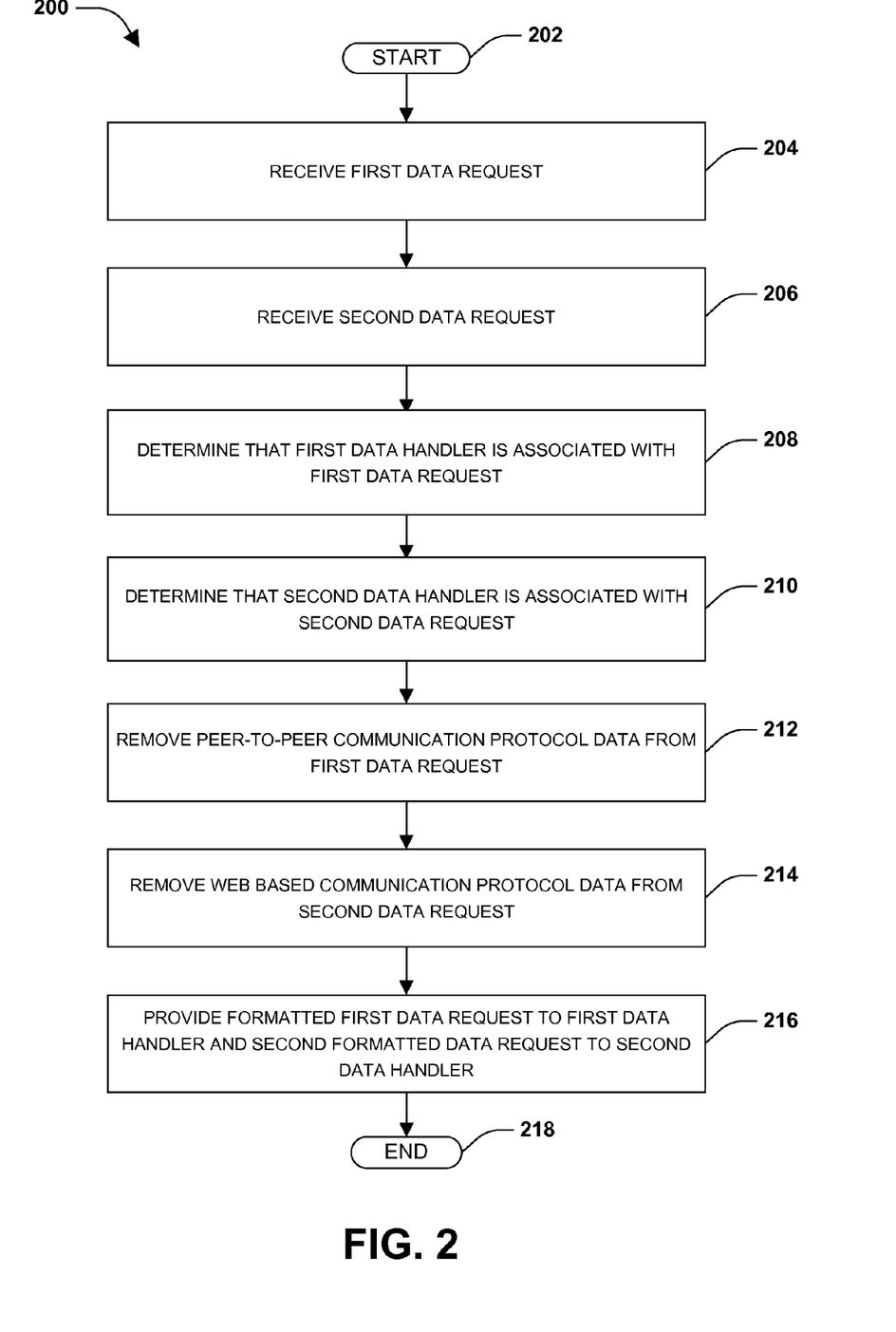
FIG. 2 is a flow chart illustrating an exemplary method of processing one or more data requests.

One embodiment of processing one or more data requests is illustrated by an exemplary method 200 in FIG. 2. At 202, the method starts. At 204, a first data request from a first requesting device may be received over a peer-to-peer communication protocol (e.g., a first data request for a video stream may be received from a tablet device). At 206, a second data request from a second requesting device may be received over a web based communication protocol (e.g., a second data request for a photo may be received through a web service from a photo website viewed by a web browser on a smart phone).

At 208, a first data handler associated with the first data request may be determined based upon the first data handler comprising functionality associated with fetching and/or formatting requested data (e.g., a video streaming data handler). The first data handler may exclude functionality associated with the peer-to-peer communication protocol (e.g., the first data handler may be communication protocol agnostic). At 210, a second data handler associated with the second data request may be determined based upon the second data handler comprising functionality associated with fetching and/or formatting requested data (e.g., a photo data handler). The second data handler may exclude functionality associated with the web based communication protocol (e.g., the second data handler may be communication protocol agnostic).

At 212, peer-to-peer communication protocol data may be removed from the first data request to create a formatted first data request (e.g., the formatted first data request may merely comprise information related to fetching and/or formatting the video stream). At 214, web based communication protocol data may be removed from the second data request to create a formatted second data request (e.g., the formatted second data request may merely comprise information related to fetching and/or formatting the photo). At 216, the formatted first data request may be provided to the first data handler and the formatted second data request may be provided to the second data handler for processing. In this way, communication protocol functionality may be abstracted away from data handlers so that data requests associated with various communication protocols may be processed regardless of whether such data handlers comprise communication protocol functionality or not. At 218, the method ends.

Figure 3:
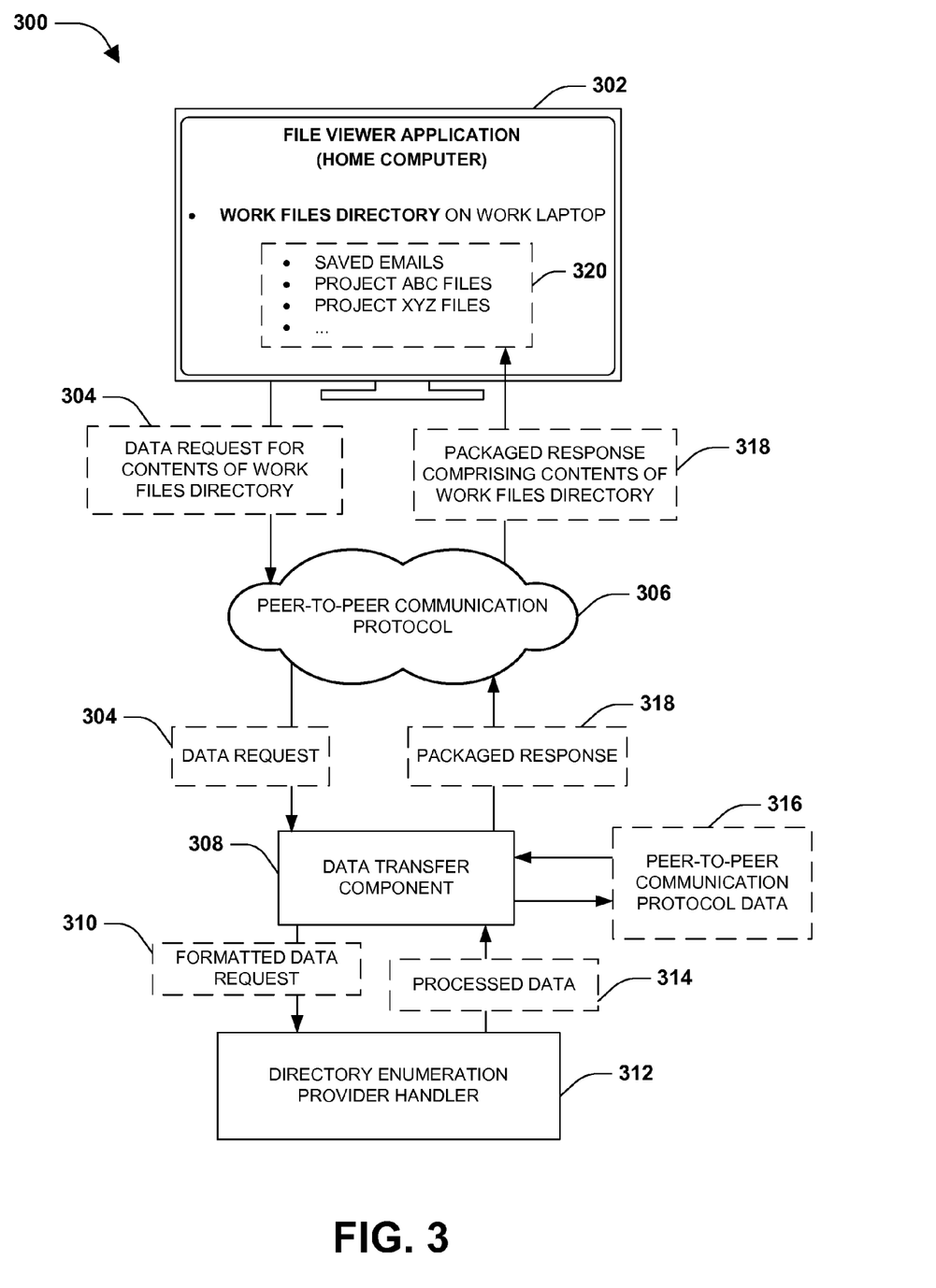
FIG. 3 is a component block diagram illustrating an exemplary system for processing one or more data requests.

FIG. 3 illustrates an example of a system 300 configured for processing a data request. The system 300 may comprise a data transfer component 308 configured to handle communication protocol processing associated with data requests/responses between requesting devices and data handlers over various communication protocols. The data transfer component 308 may be configured to receive a first data request 304 from a first requesting device. For example, the first data request 304 may comprise a request from a file viewing application on a home computer 302 for an enumerated list of files within a work files directory located on a work computer (e.g., the data transfer component 308 may be associated with the work computer and/or a directory enumeration provider handler 312). The first data request 304 may be received over a first communication protocol (e.g., a peer-to-peer communication protocol 306).

The data transfer component 308 may determine that a first data handler may be associated with the first data request 304. For example, the first data request 304 may comprise information indicating that the directory enumeration provider handler 312 may be capable of enumerating the work files directory on the work computer. In one example, the first data handler may lack functionality associated with the first communication protocol (e.g., the directory enumeration provider handler 312 may lack peer-to-peer communication functionality). The data transfer component 308 may extract first communication protocol data from the first data request 304 to format the first data request 304 for the first data handler. For example, peer-to-peer communication protocol data 316 may be removed from the first data request 304 to create a formatted first data request 310. The data transfer component 308 may provide the formatted first data request 310 to the first data handler.

The data transfer component 308 may receive first processed data 314 from the first data handler. For example, the directory enumeration provider handler 312 may create and/or provide to the data transfer component 308 with the first processed data 314 comprising an enumeration of files within the work files directory on the work computer. The data transfer component 308 may be configured to package the first processed data 314 into a first packaged response 318 using the first communication protocol data, such as the peer-to-peer communication protocol data 316. The data transfer component 308 may send the first packaged response 318 over the first communication protocol to the first requesting device. For example, the data transfer component 308 may send the first packaged response 318 over the peer-to-peer communication protocol 306 to the file viewer application on the home computer 302. In this way, the enumeration of files within the work files directory may be presented 320 within the file view application.

Figure 4:
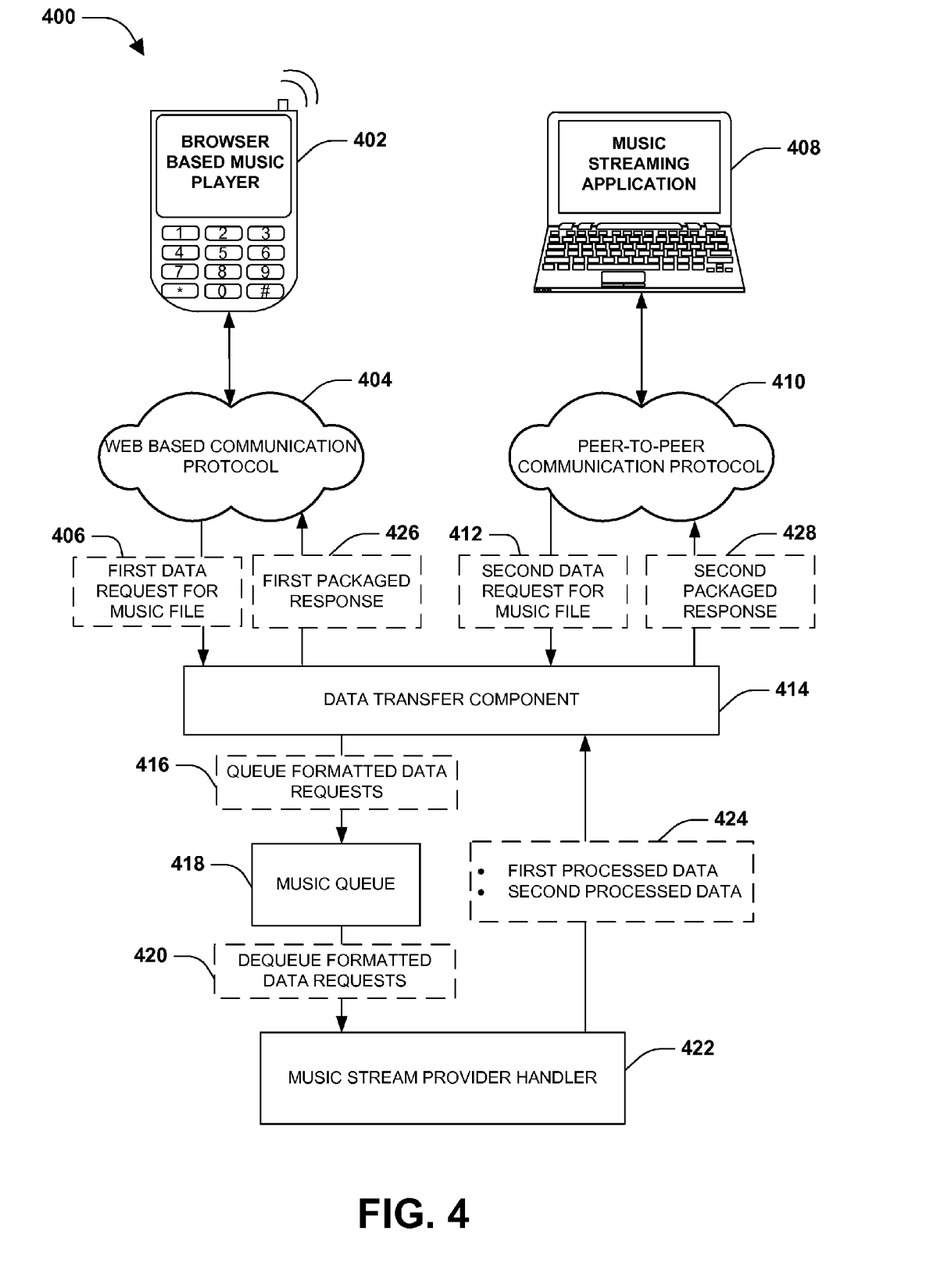
FIG. 4 is a component block diagram illustrating an exemplary system for processing one or more data requests.

FIG. 4 illustrates an example of a system 400 configured for processing data requests. The system 400 may comprise a data transfer component 414 configured to handle communication protocol processing associated with data requests/responses between requesting devices and data handlers over various communication protocols. The data transfer component 414 may be configured to receive a first data request 406 from a first requesting device. For example, the first data request 406 may comprise a request from a browser based music player on a smart phone 402 for a requested music file located on a home desktop (e.g., the data transfer component 414 may be associated with the home desktop and/or a music stream provider handler 422). The first data request 406 may be received over a first communication protocol (e.g., a web based communication protocol 404). The data transfer component 414 may format the first data request 406 for the music stream provider handler 422 to create a formatted first data request. For example, web based communication protocol data may be extracted from the first data request 406 to create the formatted first data request.

The data transfer component 414 may receive a second data request 412 from a second requesting device. For example, the second data request 412 may comprise a request from a music streaming application on a laptop 408 for a requested music file located on the home desktop. The second data request 412 may be received over a second communication protocol (e.g., a peer-to-peer communication protocol 410). The data transfer component 414 may format the second data request 412 for the music stream provider handler 422 to create a formatted second data request. For example, peer-to-peer communication protocol data may be extracted from the second data request 412 to create the formatted second data request.

The data transfer component 414 may be configured to queue the formatted first data request and/or the formatted second data request (e.g., queue formatted data requests 416) into a music queue 418 associated with the music stream provider handler 422. The formatted first and second data requests may be queued based upon priorities determined for the first and second data requests. For example, the music streaming application on the laptop 408 may be a preferred application (e.g., the music streaming application may have submitted fewer requests than the browser based music player, the music streaming application may be associated with a high trust level, a music file requested by the music streaming application may be more efficient to process before a music file requested by the browser based music player, etc.), and thus the formatted second data request may be queued before the formatted first data request.

The music stream provider handler 422 may dequeue 420 one or more formatted data requests, and process such requests. For example, the music stream provider handler 422 may dequeue the formatted second data request. The music stream provider handler 422 may fetch a requested music file, and provide the requested music file to the data transfer component 414 as processed data 424 (e.g., second processed data). The music stream provider handler 422 may dequeue the formatted first data request. The music stream provider handler 422 may fetch a requested music file, and provide the requested music file to the data transfer component 414 as processed data 424 (e.g., first processed data). In this way, the data transfer component 414 may receive the processed data 424.

The data transfer component 424 may be configured to package the first processed data into a first packaged response 426 using the web based communication protocol data. The first packaged response 426 may be sent to the browser based music player on the smart phone 402 over the web based communication protocol 404. The data transfer component 414 may be configured to package the second processed data into a second packaged response 428 using the peer-to-peer communication protocol data. The second packaged response 428 may be sent to the music streaming application on the laptop 408 over the peer-to-peer communication protocol 410. In this way, the data transfer component 414 may processes data requests/responses associated with various communication protocols on behalf of data handlers.

Figure 5:
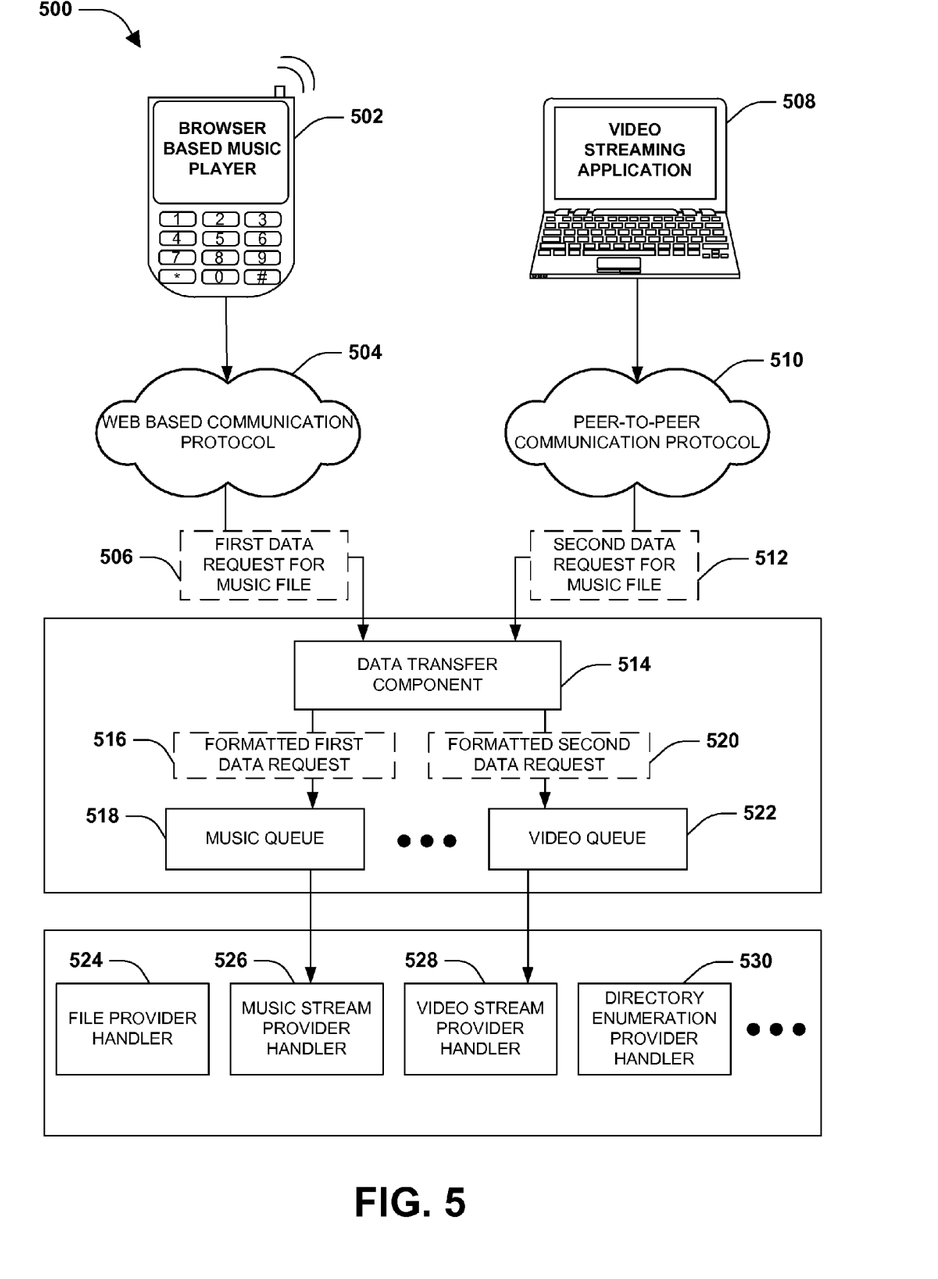
FIG. 5 is a component block diagram illustrating an exemplary system for processing one or more data requests.

FIG. 5 illustrates an example of a system 500 configured for processing data requests. The system 500 may comprise a data transfer component 514 configured to handle communication protocol processing associated with data requests/responses between requesting devices and data handlers over various communication protocols. The data transfer component 514 may be configured to receive a first data request 506 from a first requesting device. For example, the first data request 506 may comprise a request from a browser based music player on a smart phone 502 for a requested music file located on a home desktop (e.g., the data transfer component 514 may be associated with the home desktop, a file provider handler 524, a music stream provider handler 526, a video stream provider handler 528, a directory enumeration provider hander 530, and/or other data handlers). The first data request 506 may be received over a first communication protocol (e.g., a web based communication protocol 504). The data transfer component 514 may format the first data request 506 for the music stream provider handler 526 to create a formatted first data request 516. For example, web based communication protocol data may be extracted from the first data request 506 to create the formatted first data request 516.

The data transfer component 514 may receive a second data request 512 from a second requesting device. For example, the second data request 512 may comprise a request from a video streaming application on a laptop 508 for a requested video file located on the home desktop. The second data request 512 may be received over a second communication protocol (e.g., a peer-to-peer communication protocol 510). The data transfer component 514 may format the second data request 512 for the video stream provider handler 528 to create a formatted second data request 520. For example, peer-to-peer communication protocol data may be extracted from the second data request 512 to create the formatted second data request 520.

The data transfer component 514 may be configured to queue the formatted first data request 516 into a music queue 518 associated with the music stream provider handler 526. In this way, the music stream provider handler 526 may dequeue and/or process the formatted first data request 516 for the requested music file. The data transfer component 514 may receive first processed data comprising the requested music file from the music stream provider handler 526. The data transfer component 514 may package the first processed data into a first packaged response using the web based communication protocol data, and may send the first packaged response over the web based communication protocol 504 to the browser based music player on the smart phone 502.

The data transfer component 514 may be configured to queue the formatted second data request 520 into a video queue 522 associated with the video stream provider handler 528. In this way, the video stream provider handler 528 may dequeue and/or process the formatted second data request 520 for the requested video file. The data transfer component 514 may receive second processed data comprising the requested video stream data from the video stream provider handler 528. The data transfer component 514 may package the second processed data into a second packaged response using the peer-to-peer communication protocol data, and may send the second packaged response over the peer-to-peer communication protocol 510 to the video streaming application on the laptop 508.

Figure 6:
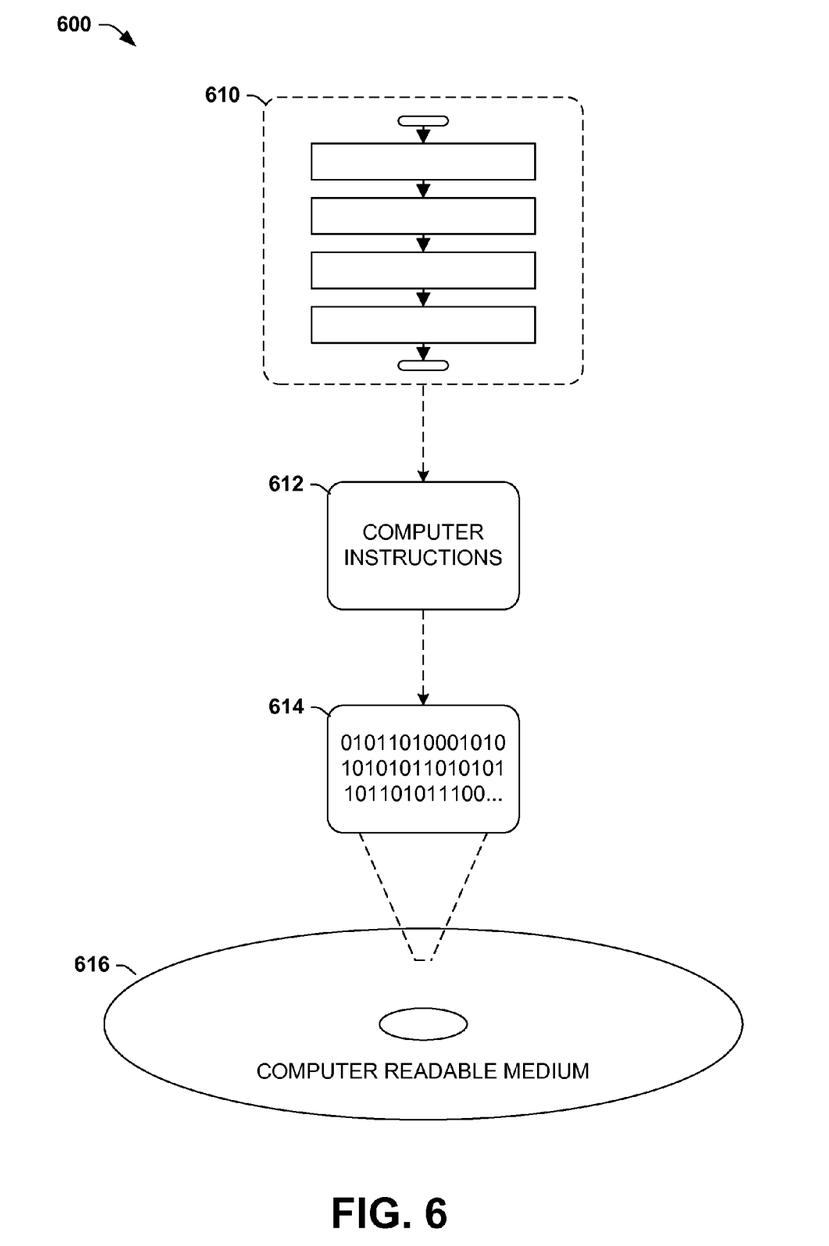
FIG. 6 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 6, wherein the implementation 600 comprises a computer-readable medium 616 (e.g., a CD-R, DVD-R, or a platter of a hard disk drive), on which is encoded computer-readable data 614. This computer-readable data 614 in turn comprises a set of computer instructions 612 configured to operate according to one or more of the principles set forth herein. In one such embodiment 600, the processor-executable computer instructions 612 may be configured to perform a method 610, such as at least some of the exemplary method 100 of FIG. 1 and/or at least some of exemplary method 200 of FIG. 2, for example. In another such embodiment, the processor-executable instructions 612 may be configured to implement a system, such as at least some of the exemplary system 300 of FIG. 3, at least some of exemplary method 400 of FIG. 4, and/or at least some of exemplary method 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 7:
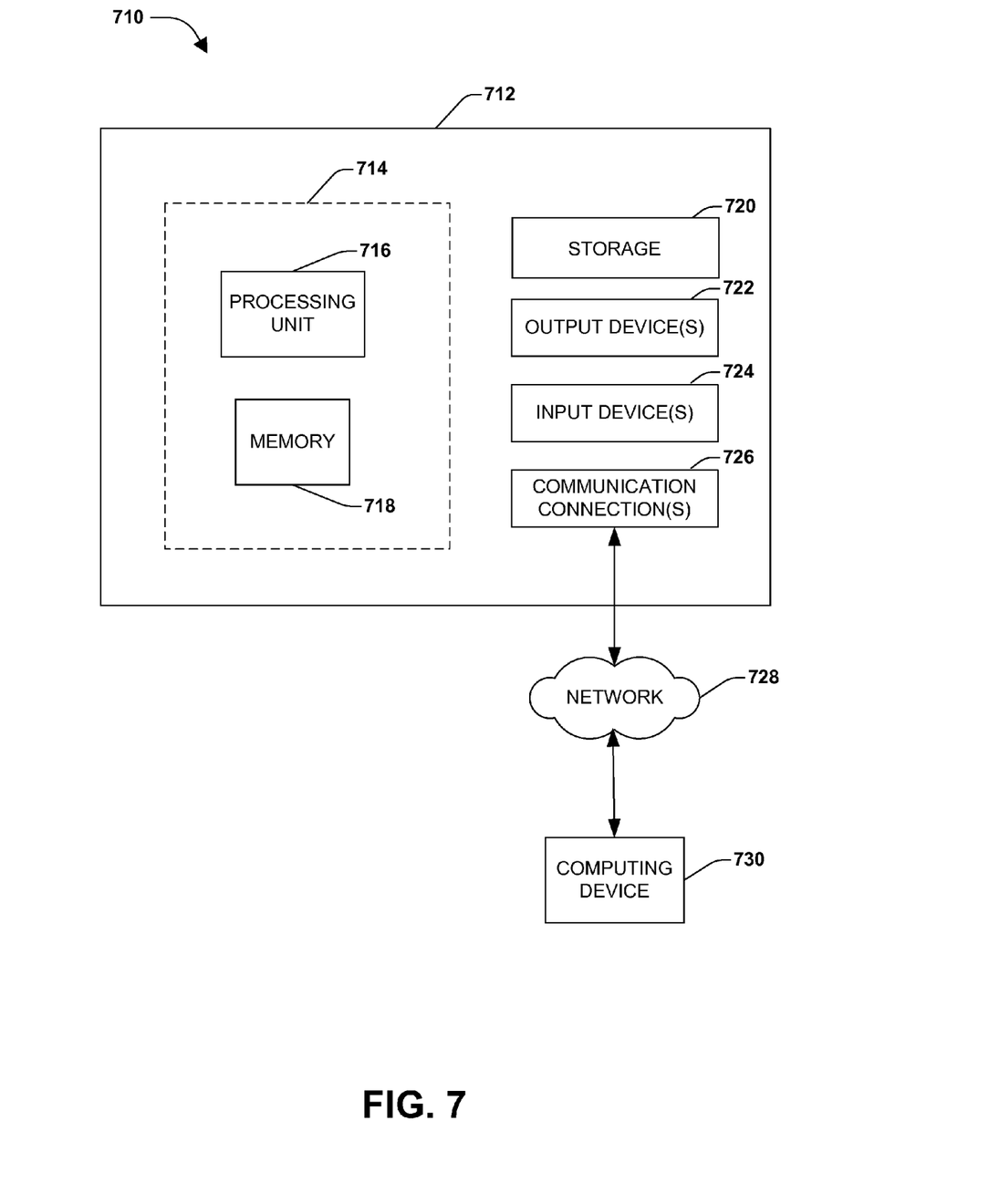
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 710 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1374), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 730 accessible via a network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for processing a data request, comprising:
receiving a first data request from a first requesting device over a first communication protocol, the first data request comprising first communication protocol data;
determining that a first data handler is associated with the first data request, the first data handler not comprising communication protocol functionality associated with the first communication protocol;
formatting the first data request for the first data handler to generate a formatted first data request, the formatting comprising:
removing the first communication protocol data from the first data request; and
storing the first communication protocol data to generate stored first communication protocol data;
providing the formatted first data request, excluding the first communication protocol data, to the first data handler;
receiving first processed data from the first data handler responsive to the providing; and
packaging the first processed data into a first packaged response using the stored first communication protocol data.

2. The method of claim 1, the first communication protocol comprising a peer-to-peer communication protocol.

3. The method of claim 1, the first communication protocol comprising a web based communication protocol.

4. The method of claim 1, comprising:
sending the first packaged response over the first communication protocol to the first requesting device.

5. The method of claim 1, comprising:
receiving a second data request from the first requesting device over the first communication protocol;
determining that a second data handler is associated with the second data request, the second data handler different from the first data handler;
formatting the second data request for the second data handler to generate a formatted second data request; and
providing the formatted second data request to the second data handler.

6. The method of claim 5, the formatting the second data request comprising removing second communication protocol data from the second data request.

7. The method of claim 1, comprising:
receiving a second data request from a second requesting device over a second communication protocol, the second communication protocol different from the first communication protocol;
determining that the first data handler is associated with the second data request;
formatting the second data request for the first data handler to generate a formatted second data request; and
providing the formatted second data request to the first data handler.

8. The method of claim 7, the formatting the second data request comprising removing second communication protocol data from the second data request.

9. The method of claim 7, the first communication protocol comprising a peer-to-peer communication protocol and the second communication protocol comprising a web based communication protocol.

10. The method of claim 1, the first data handler corresponding to at least one of:
a video stream provider handler;
a photo stream provider handler;
a file provider handler; or
a directory enumeration provider handler.

11. The method of claim 1, the formatting comprising formatting the first data request using a communication protocol layer.

12. The method of claim 1, the providing comprising:
placing the formatted first data request into a queue associated with the first data handler based upon a priority associated with the formatted first data request.

13. The method of claim 12, comprising:
managing the formatted first data request within the queue based upon computing resources available to the first data handler.

14. The method of claim 1, the receiving first processed data comprising:
receiving the first processed data as at least one of a stream, a file, or buffer data.

15. The method of claim 7, the first communication protocol comprising a web based communication protocol and the second communication protocol comprising a peer-to-peer communication protocol.

16. A system for processing a data request, comprising:
a hardware data transfer component, not comprising a first data handler, configured to:
receive a first data request from a first requesting device over a first communication protocol, the first data request comprising first communication protocol data;
determine that the first data handler is associated with the first data request, the first data handler not comprising communication protocol functionality associated with the first communication protocol;
format the first data request for the first data handler to generate a formatted first data request by:
removing the first communication protocol data from the first data request, and
storing the first communication protocol data to generate stored first communication protocol data;
provide the formatted first data request, excluding the first communication protocol data, to the first data handler;
receive first processed data from the first data handler responsive to providing the formatted first data request to the first data handler; and
package the first processed data into a first packaged response using the stored first communication protocol data.

17. The system of claim 16, the hardware data transfer component configured to:
send the first packaged response over the first communication protocol to the first requesting device.

18. The system of claim 16, the hardware data transfer component configured to:
receive a second data request from a second requesting device over a second communication protocol, the second communication protocol different from the first communication protocol;
determine that the first data handler is associated with the second data request;

format the second data request for the first data handler to generate a formatted second data request; and provide the formatted second data request to the first data handler.

19. The system of claim 16, the first communication protocol comprising at least one of a peer-to-peer communication protocol or a web based communication protocol.

20. A computer-readable storage device comprising instructions that when executed perform a method for processing a data request, the method comprising:

receiving a first data request from a first requesting device over a first communication protocol, the first data request comprising first communication protocol data;

determining that a first data handler is associated with the first data request, the first data handler not comprising communication protocol functionality associated with the first communication protocol;

formatting the first data request for the first data handler to generate a formatted first data request, the formatting comprising:

removing the first communication protocol data from the first data request; and storing the first communication protocol data to generate stored first communication protocol data;

providing the formatted first data request, excluding the first communication protocol data, to the first data handler;

receiving first processed data from the first data handler responsive to the providing; and packaging the first processed data into a first packaged response using the stored first communication protocol data.

* * * * *